(12) United States Patent
Dobbins

(10) Patent No.: US 11,438,555 B1
(45) Date of Patent: Sep. 6, 2022

(54) METHOD FOR VERIFYING TAMPERING OF AN ELECTRONIC DEVICE

(71) Applicant: Vincent A Dobbins, Glen Burnie, MD (US)

(72) Inventor: Vincent A Dobbins, Glen Burnie, MD (US)

( * ) Notice: Subject to any disclaimer, the term of this patent is extended or adjusted under 35 U.S.C. 154(b) by 0 days.

(21) Appl. No.: 17/734,606

(22) Filed: May 2, 2022

(51) Int. Cl.
| | |
|---|---|
| *H04N 7/18* | (2006.01) |
| *H04N 5/232* | (2006.01) |
| *G06F 21/31* | (2013.01) |
| *H04N 5/76* | (2006.01) |
| *H04R 3/00* | (2006.01) |
| *G06V 40/16* | (2022.01) |

(52) U.S. Cl.
CPC ............. *H04N 7/188* (2013.01); *G06F 21/31* (2013.01); *G06V 40/172* (2022.01); *H04N 5/23222* (2013.01); *H04N 5/76* (2013.01); *H04R 3/00* (2013.01)

(58) Field of Classification Search
CPC ...... H04N 7/18; H04N 7/188; H04N 5/23222; H04N 5/76; G06V 40/172; G06V 40/20; G06F 21/31; H04R 3/00
USPC .................................................. 348/380, 522
See application file for complete search history.

(56) References Cited

U.S. PATENT DOCUMENTS

| | | | | |
|---|---|---|---|---|
| 9,185,248 | B2 * | 11/2015 | Earnshaw | H04N 1/00347 |
| 10,405,144 | B2 * | 9/2019 | Danknick | H04L 67/52 |
| 10,511,965 | B2 * | 12/2019 | Jiang | H04W 12/03 |
| 10,565,400 | B2 * | 2/2020 | Asokan | H04L 9/0838 |
| 11,354,403 | B1 * | 6/2022 | Ricket | G06F 21/64 |
| 2014/0323115 | A1 * | 10/2014 | Bennett | H04W 12/02 |
| | | | | 455/418 |
| 2019/0253416 | A1 * | 8/2019 | Derakhshani | G06F 21/32 |
| 2022/0165092 | A1 * | 5/2022 | Watanabe | G06V 40/103 |

\* cited by examiner

*Primary Examiner* — Trang U Tran
(74) *Attorney, Agent, or Firm* — Usha S. Koshy

(57) ABSTRACT

A method for verifying tampering of an electronic device by a third party who picks up and attempts to unlock the device when the device is inadvertently left in a place by the owner of the device. The method comprises an application software downloaded within the device that senses the movement of the device when picked up by a third party and triggers the bidirectional cameras within the device to silently start capturing images of the third party and video record the tampering actions which are time and date stamped, uploaded to a cloud source and sent by text and email to a second device for review of the tampering of the device, and identification of the third party who tampered with the device.

12 Claims, 7 Drawing Sheets

METHOD FOR VERIFYING TAMPERING OF AN ELECTRONIC DEVICE

FIELD OF THE INVENTION

The present invention generally relates to systems and methods used to protect mobile electronic devices. More particularly, the invention relates to a method for verifying tampering of an electronic device and the identity of an unauthorized user of a mobile electronic device.

BACKGROUND OF THE INVENTION

Mobile electronic devices which include mobile phones, tablets, IPads, laptop computers to name a few have gained in popularity over the last decades as the vehicles for communications either by voice, text and other means as well as, for conducting transactions such as buying and selling goods, real estate, trading in the marketplace etc. The mobile nature of these electronic devices also make them susceptible as easy targets for theft, or even unauthorized use by third parties to access personal information and stored data on the devices, to steal identities and illegitimately use the stored information on the devices without the owners knowledge.

When a smart phone or other smart device is inadvertently left unattended in a location by the owner, a nosy individual may pick up the device and try to unlock it to snoop into the contents of the device which invariably include personal and other information relating to the owner of the device. This unauthorized attempt to unlock the device and access the data in the device by a third party is considered, tampering of the device. Such tampering of an electronic device may go unnoticed by the owner of the device if and when the device is retrieved. Generally when a smart phone or other device is left unsupervised and the owner eventually retrieves it, there is a silent assumption that the device has been moved from its location and perhaps tampered with, although proving the tampering and breach of the data within the device may be difficult if there is no perceptible evidence that tampering of the device and access of the data within the device occurred.

Currently, the popular means to locate a smart phone that is lost, or stolen is through GPS (Global Positioning System). Most smart phones have built in GPS for tracking the phone. Other means for tracking smart phones or other smart devices are through tracking applications that can be downloaded free, or for a fee. Although tracking of the phone, or other smart devices using these applications or the GPS, may ultimately result in recovering a misplaced, lost, or stolen device, verifying the identity of the person who may have had possession of the device while it was lost or stolen and any attempts by that person to tamper with the device may be hard to prove without a system and method that is in place within that smart phone or other smart device, to identify the person who had possession of the device even for a short period of time.

There is a need in the prior art for a means to verify with certainty the identity of the person who picked up and tampered with a smart phone, or other smart device while the device was misplaced by the owner. The present invention provides the means to verify the identity of the person who picked up and tampered with or attempted to tamper with a smart device such as a smart phone through the use of the built-in cameras and micro phone embedded within the phone in a novel way, by capturing the photographic images of the third party who picked up the phone misplaced by the owner. The photographic images of the third party who tampered with the phone as well as video and audio recordings of the persons tampering activities with the smart phone are saved within the device and also sent to a cloud service and a second device as backup without the persons knowledge so that when the device is ultimately recovered, the owner of the device can access the photographic image (s) and video and audio recordings of the unauthorized person who tampered with the smart phone through the images and recordings saved within the device, or through the cloud source and the secondary device where that information was uploaded, to verify the identity of the third party who tampered with the device.

The features and objects of the current inventive concept to verify tampering of a smart phone or other smart device and the identity of the third party who tampered with the device will become obvious to one skilled in the art through the following summary of the invention and the detailed description of the invention, viewed in conjunction with the drawings presented.

SUMMARY OF THE INVENTION

The present invention is a method to verify tampering of a smart phone or other smart device by a third party and the identity of that person who picks up and tampers with a smart phone or other smart device that was inadvertently misplaced by the owner of the device.

The primary object of the present invention is to identify with certainty the person who was in possession of a misplaced smart phone or other smart device and had attempted to tamper or succeeded in tampering with the smart phone or other smart device.

In the exemplary embodiment of the present invention, the smart phone or other smart device has dual cameras and/or a bi-directional camera. In this embodiment, an application software (App) that controls the cameras and the video and audio functions of the cameras is downloaded and installed within the smart phone, or other smart device to integrate with the operating system of the device. The application software has features enabling the cameras within the device to be silently turned on when a movement of the device is sensed as when the smart phone or other smart device is picked up by a third party.

In the exemplary embodiment of the invention, when a third party who is not the owner of the smart phone or other smart device picks up the locked or unlocked device and moves it to another location, the movement of the smart phone is sensed by the application software within the device, triggering the front and rear cameras on the device to silently turn on at the same time, with the rear camera showing the device moving away from the surface on which it was placed when it was picked up by the third party, and the front camera capturing images of that person. If the device was placed with the face down by the owner, the front camera would show the device moving away from the surface and the back camera would capture the images of the person who picked up the device. In this embodiment, triggering the camera functions also triggers a video and audio recording of the person in possession of the device, their surroundings and their tamper related activities relating to the device.

In the embodiments of the invention, the camera functions are also triggered by improper unlocking attempts such as incorrect entry of an unlock pass code, incorrect biometric finger print, incorrect facial recognition etc., as well as other tampering actions performed on the device as for example, attempts to remove the SIM card by the third party who is in possession of the device.

In the embodiments of the invention, when the smart phone is removed from the spot where the owner had placed it and picked up by a third party, after the camera is triggered to capture images and video and audio recordings of the third party, these functions of image capture and video and audio recordings will continue for a period of time by a timer set with a pre-selected time frame within the application software downloaded on the device. In this embodiment of the invention, the image capture and camera functions will also continue as long as motion is detected by the timer within the device.

In all embodiments of the invention, once a smart phone or other smart device is inadvertently misplaced by the owner of the device and picked up by a third party and the camera and video/audio recording functions are triggered, all events including captured images and audio and video recordings are date and time stamped, and saved within the device and additionally, uploaded to a cloud source and another device which may be another smart device, or computer for review, so that the identity of the person who picked up the device and tampered with it can be verified with certainty and turned over to the authorities if tampering of the device is evident through the images and video and audio recordings.

In embodiments of the invention, the owner of the smart phone, or other smart device can program a delay in the camera image capture and video and audio recording functions so that the owner can unlock the device without the recordings being activated. In this embodiment, the application software allows the owner of the smart phone or other smart device to disable the camera image capturing and video recording features when the device is in the possession of the owner.

The features and embodiments of the invention can also be used to identify and apprehend a third party who steals a smart phone or other smart device without the use of GPS or other tracking systems. In this embodiment, when the device is stolen by a third party, attempts to unlock the device by that person using facial recognition or incorrect pass code entry would trigger the cameras in the device to start capturing the images of the third party in possession of the device and start the video and audio recording features as well. The images of the person who stole the device and the video and audio recordings of the surroundings and the tampering activities by that person will be saved within the device and also uploaded to a cloud service and another device for review by the authorities to help apprehend the person who stole the device.

The foregoing summary of the present invention and its embodiments should not be construed to limit the scope of the invention. In this summary of the invention and in the specification in general, references to the embodiments of the invention as, "the exemplary embodiments," "in the embodiments," "all embodiments" and related references to embodiments of the invention do not necessarily refer to the same embodiment (s). Rather, these references to the various embodiments in general mean that a particular feature, structure, or characteristic described in conjunction with an embodiment is included in at least some embodiments, but not necessarily all embodiments of the invention. The objects, embodiments, and features of the present invention as described in this summary of the invention will be further appreciated and will become obvious to one skilled in the art when viewed in conjunction with the accompanying drawings, detailed description of the invention, and the appended claims.

DETAILED DESCRIPTION OF THE INVENTION

The present invention is a method for verifying tampering and the identity of a third party who picks up a smart phone or other smart device left in a spot by the owner of the device and attempts to tamper, or tampers with the device unbeknown to the owner of the device. When the owner of a smart phone or other smart device inadvertently misplaces or leaves a phone in a place where a third party can easily access the device, if the third party after picking up the device leaves the device back in the spot where he/she had picked it up from, once the owner recovers the smart phone, or other smart device, there is a silent assumption by the owner that perhaps the device was tampered with. However, proving the tampering and breach of the data within the device may be difficult if there is no perceptible evidence that tampering of the device and access of the data within the device occurred.

The present invention provides a method for verifying the identity of the third party who picks up a smart phone or other smart device from the location where the owner had left the device, or stolen by a third party, without the use of GPS or other tracking means currently available for locating a lost or stolen smart phone or other smart device.

Figure 1:
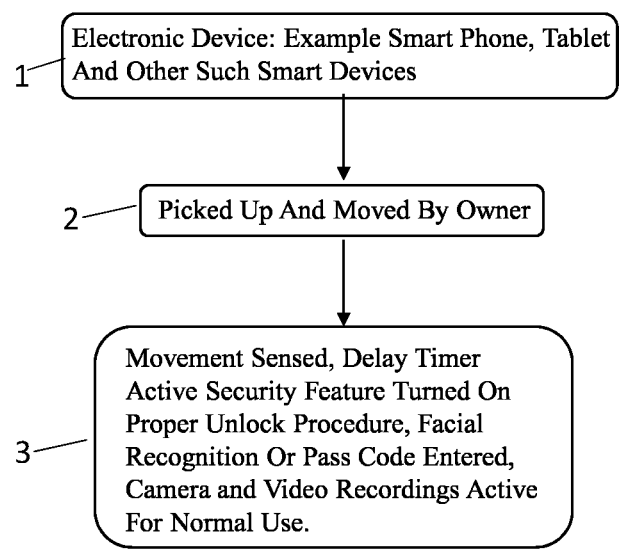
FIG. 1 is a block diagram showing the normal steps involved in the use of a smart phone or other smart device by the owner of the device.

Referring now to the drawings, in particular to FIG. 1 the figure is a block diagram showing the normal steps involved in the use of a smart phone, or other smart device 1 by the owner of the device. Once the owner of the device picks up and moves the device 2, the movement is sensed 3 by the device and the owner is presented with the unlock features of facial recognition or entry of the pass code to unlock the device. The camera and video recording functions are active for normal use. When the device is unlocked with the correct facial recognition and passcode, the camera does not automatically turn on for image capture or video recording as when an unauthorized third party picks up and moves the device.

Figure 2:
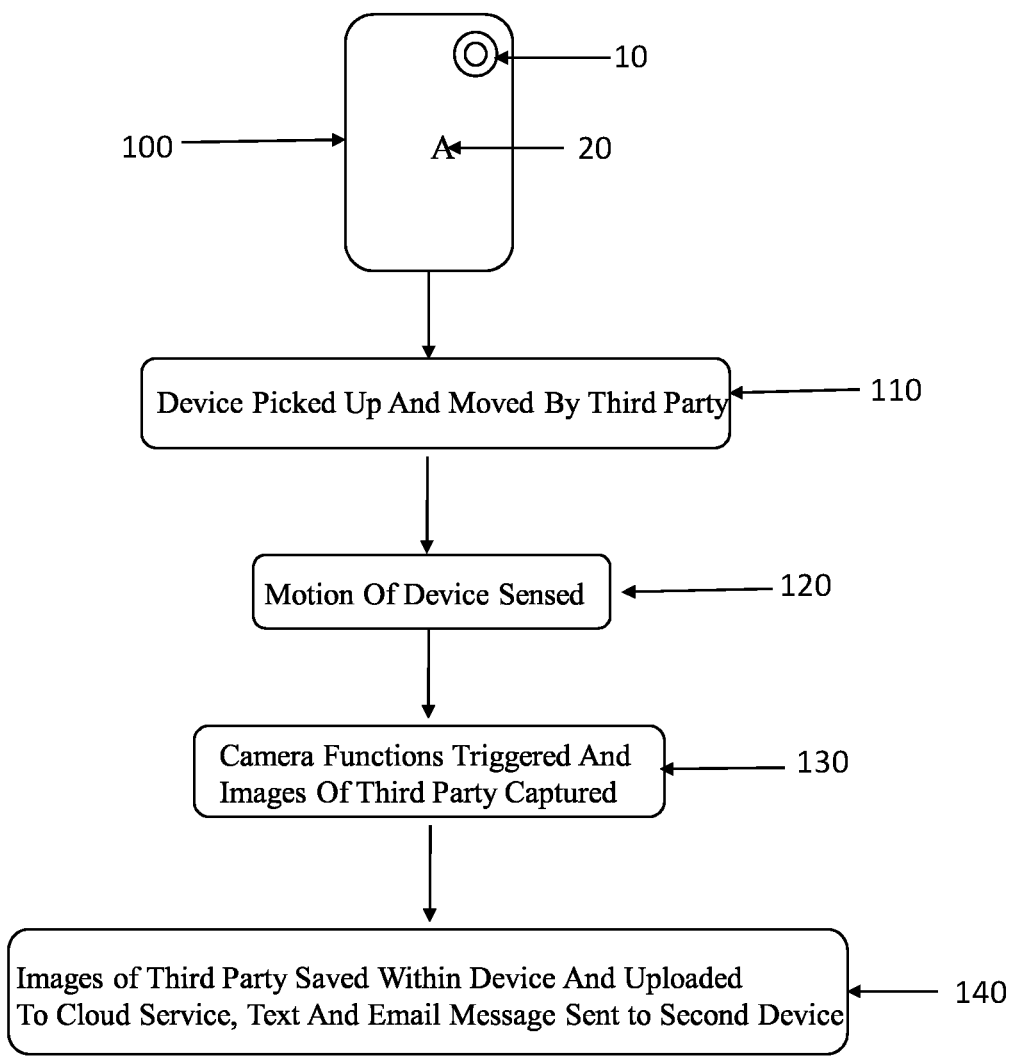
FIG. 2 is a block diagram showing the triggering and activation of the camera (s) within the smart device to capture one or more images when the device is picked up and moved by a third party.

FIG. 2 is a block diagram showing the triggering and activation of the camera (s) 10 within the smart device 100 to capture one or more images when the device is picked up and moved by a third party 110. The application software (App) 20 that controls the dual or bi-directional cameras and the video and audio functions of the cameras is downloaded and installed within the smart phone to integrate with the operating system of the smart phone, or other smart device. The application software has features enabling the cameras within the device to be silently turned on when a movement of the device is sensed 120 as when the smart phone or other smart device is picked up by a third party. Once the camera functions are triggered, the rear camera shows the device moving away from the surface on which it was placed when it was picked up by the third party, and the front camera captures the image(s) of the third party who has picked up the smart phone 130. When the electronic device is placed on a surface with the face down, the front camera of the bi-directional cameras captures the image of the electronic device moving away from the surface when picked up by the third party and the rear camera of the bi-directional cameras captures the image (s) of the third party in possession of the device. Then captured images of the third party are saved within the device and uploaded to a cloud source and sent by text and email to a second device 140 for review, to identify the third party who was in possession of the device.

Figure 3:
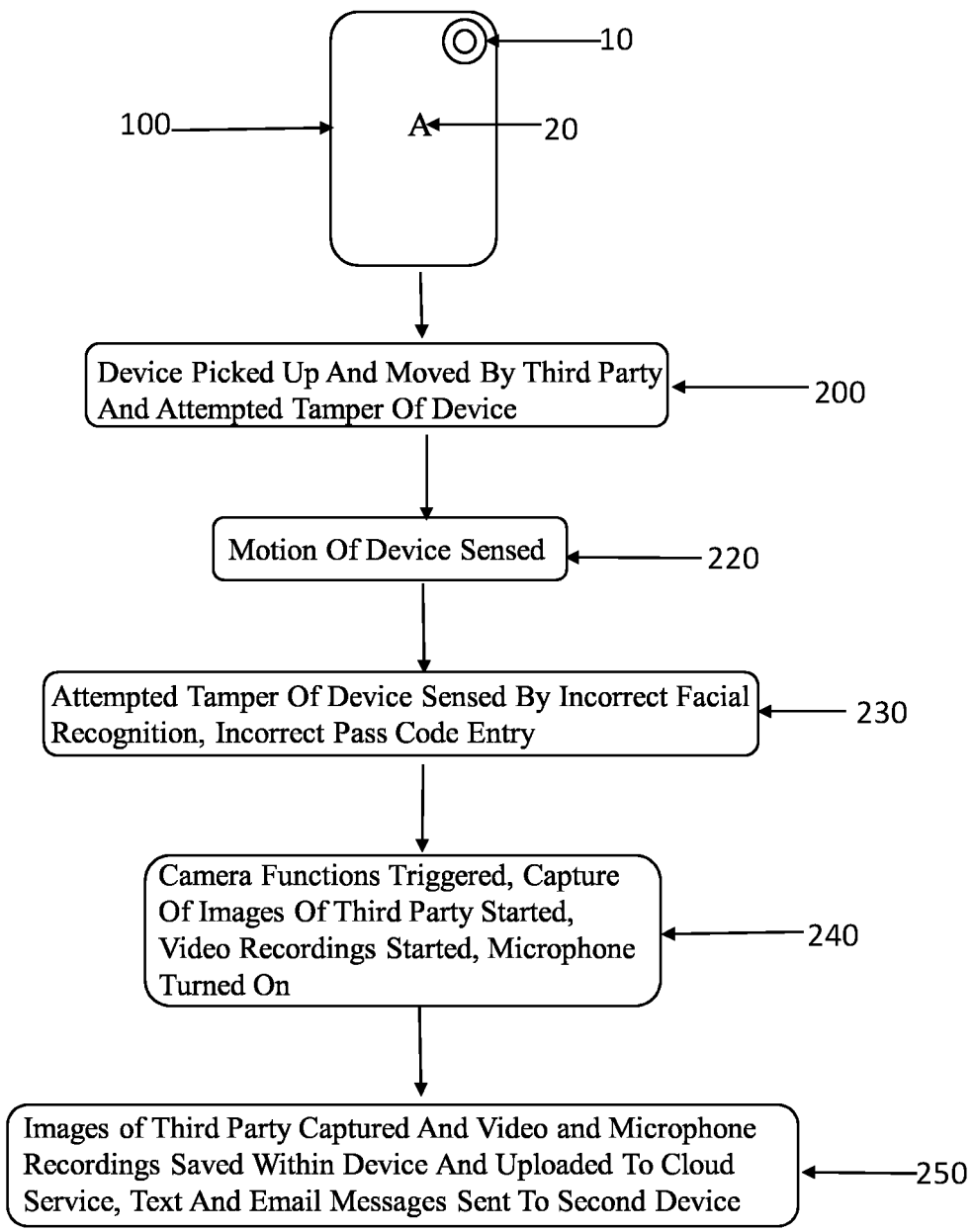
FIG. 3 is a block diagram showing the triggering and activation of the camera (s) within the smart device to capture one or more images and video record the actions of a third party when tampering of the device is attempted by that party.

FIG. 3 is a block diagram showing the triggering and activation of the camera (s) within the smart device to capture one or more images and video record the actions of a third party who picks up the device and tampering of the device is attempted by that party. When the device is picked up and moved by a third party 200 the motion of the device is sensed 220 and attempted tampering of the device is sensed by incorrect facial recognition, incorrect pass code entry 230. With movement of the device and attempts to tamper with the device by trying to unlock the device through incorrect pass code entry 230 the camera functions are triggered to capture the images of the third party holding the device, the micro phone is turned on and video of the third party's attempts at tampering is recorded 240. Images of the third party captured by the camera and the video and audio recordings of the tampering actions are saved within the device and uploaded to a cloud source and sent by text and email to another device 250 for review by the owner once the device is recovered.

Figure 4:
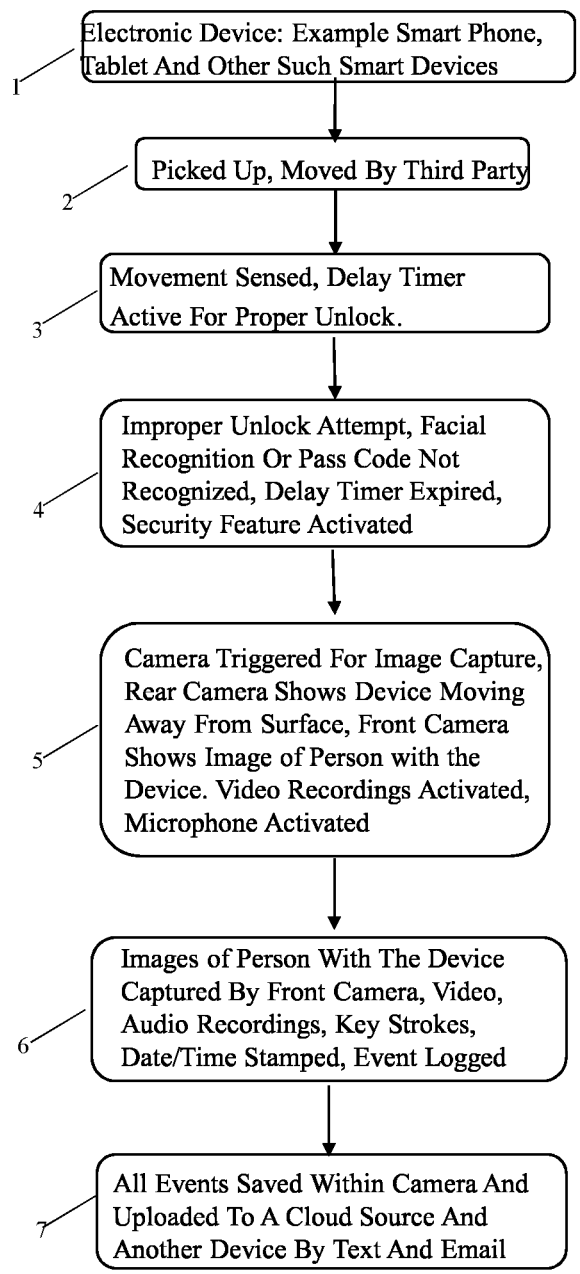
FIG. 4 is a flow chart of the actions triggered when a third party picks up a smart phone, or other smart device and tampers with the device by attempting to unlock it using an unauthorized pass code.

FIG. 4 is a flow chart showing the steps involved when an unauthorized third party 2 picks up the electronic device 1 and moves it from the location it was placed by the owner. The movement of the device is sensed 3 and the delay timer is active for proper unlock. Delay timer expires and security features remain active with improper unlock attempt by the third party through facial recognition and incorrect passcode entries 4. The movement of the device by the third party and improper unlock attempt triggers the camera 5 to start silently capturing the image (s) of the third party and additionally activating video recordings and activating the microphone. The front camera shows the image (s) of the third party and the back camera shows the device moving away from the surface where the owner has placed the device. The image (s) of the person with the device captured by the front camera along with the video and audio recordings and key strokes are date/time stamped and the event logged 6. All the events are saved within the camera and uploaded to a cloud source and sent by text and email to another device as backup 7 for review by the owner once the device is recovered.

Figure 5:
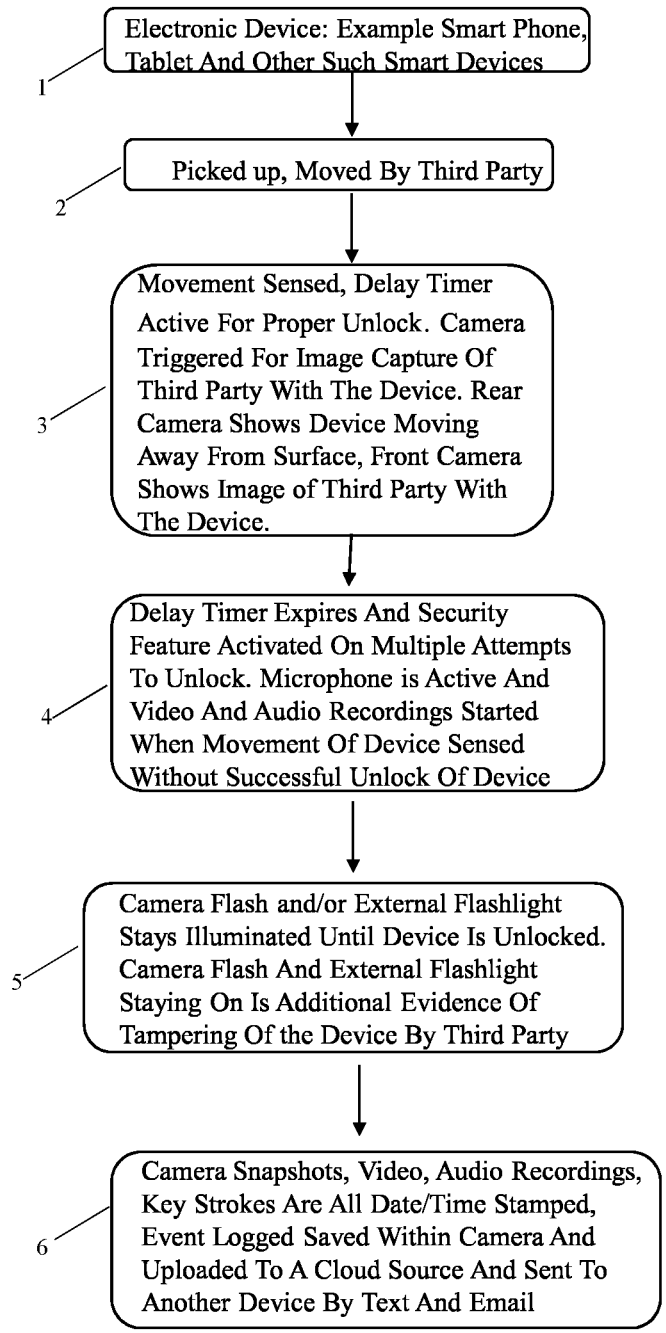
FIG. 5 is a flow chart of the actions triggered when a smart phone or other smart device is picked up by a third party and multiple attempts are made by the third party to unlock the device.

FIG. 5 is a flow chart describing further features involving the activation of the image capture and video recording features of the camera within the smart phone or other smart device when the device is moved from the location placed by the owner and picked up by a third party. When the electronic device 1 is picked up and moved by a third party 2 the movement is sensed 3 and the camera is triggered to start capturing the image (s) of the suspect. Delay timer expires and security feature is activated on attempt by the suspect to unlock the device and video and audio recordings of the suspect is started 4. The camera flash and external flashlights stay illuminated 5 until the device is unlocked. The camera flash and external flashlight staying on is additional evidence of tampering of the device by the third party. The camera snapshots, video and audio recordings of the third party and key strokes are all date/time stamped, event logged and saved within the device and uploaded to a cloud source and sent by text and email to another device as backup 6 for review by the owner of the device once the device is recovered.

Figure 6:
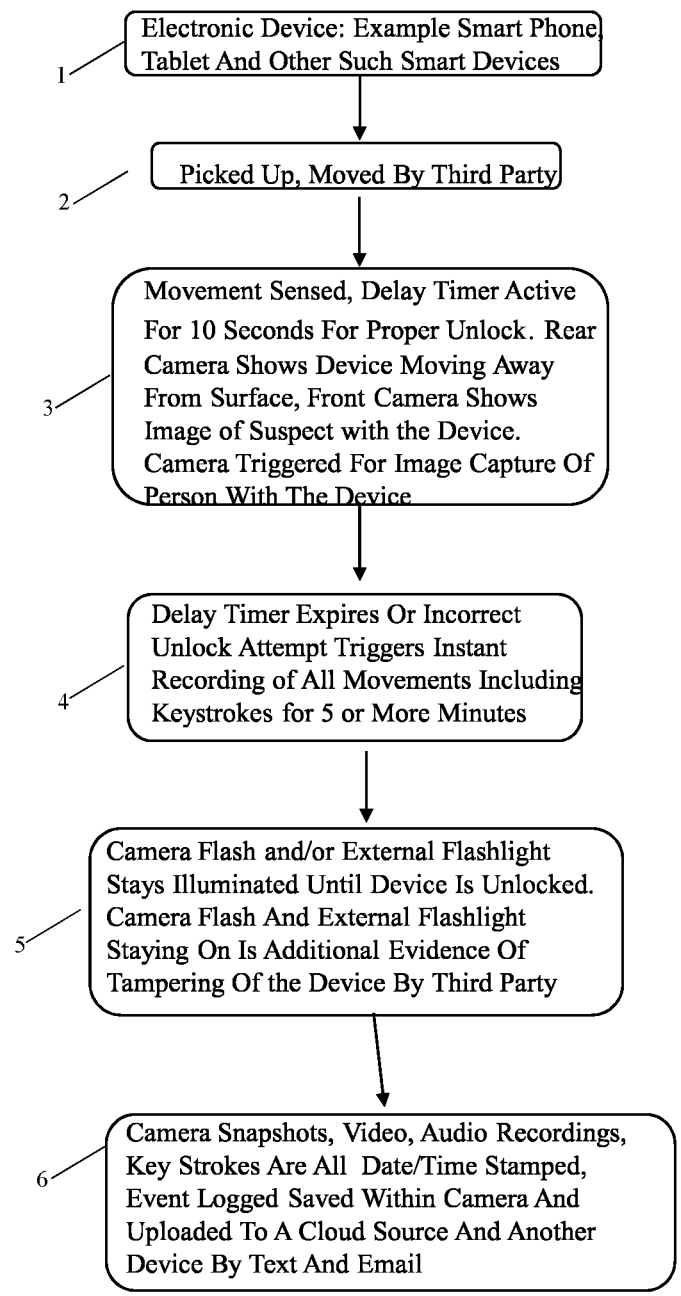
FIG. 6 is another flow chart of the actions triggered when a smart phone or other smart device is picked up by a third party and attempts are made by the third party to unlock the device which actions are recorded with a timer set to record the tampering activities.
Figure 7:
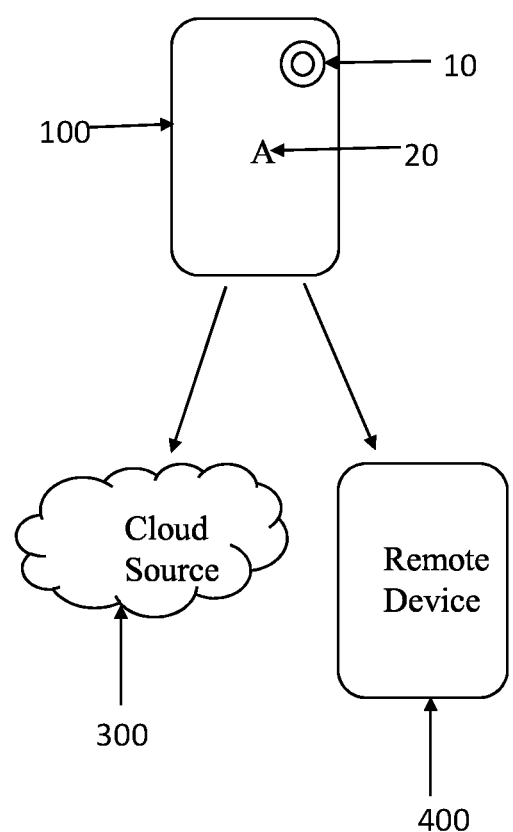
FIG. 7 is a block diagram of the general architecture of the invention where the captured images and video recordings of a third party who picked up and tampered with a smart phone, or other smart device are uploaded to a cloud source and by text and email to a remote device to verify the identity of the third party who picked up the smart device from the location where the owner inadvertently left it unattended.

FIG. 6 is another flow chart describing additional features of the present invention. After the electronic device 1 is picked up and moved by a third party 2 the movement is sensed 3 and the delay timer is active for 10 seconds for proper unlock. Delay timer expiration after 10 seconds or incorrect unlock 4 triggers instant recoding of all movements including keystrokes for 5 or more minutes. The camera flash and external flashlights stay illuminated 5 until the device is unlocked. The camera flash and external flashlight staying on is additional evidence of tampering of the device by the third party. The camera snapshots, video and audio recordings of the suspect and key strokes are all date/time stamped, event logged and saved within the device and uploaded to a cloud source and sent by text and email to another device as backup 6 for review by the owner of the device once the device is recovered, FIG. 7 is a block diagram of the general architecture of the invention where the captured images and video recordings of a third party who picked up and tampered with a smart phone or other smart device 100 are uploaded to a cloud source 300 and a remote device 400 as backup to verify the identity of the third party who picked up the smart device from the location where the owner inadvertently left it unattended.

While the present invention has thus been described through its preferred embodiments and related figures, it is to be understood that the embodiments of the present invention as described herein do not limit any application or scope of the invention, and that the invention can be carried out and practiced in various ways and implemented in embodiments other than the ones outlined and described above. It should be understood and obvious to one skilled in the art that alternatives, modifications, and variations of the embodiments of the present invention may be construed as being within the spirit and scope of the appended claims.

What is claimed is:

1. A method for verifying tampering of an electronic device said method comprising:
    (a) an application software that controls functions of bi-directional cameras within said electronic device downloaded and installed within said electronic device to integrate with operating system of said electronic device;
    (b) said application software sensing a movement of said electronic device to trigger said bi-directional camera functions on said electronic device to start silently capturing images of a third party in possession of said electronic device;
    (c) said bidirectional cameras in said electronic device silently video recording tampering actions by said third party in possession of said electronic device; and
    (d) said captured images and said video recordings are time and date stamped and saved within said electronic device, uploaded to a cloud source and sent by text and email to a second device for verifying tampering of said electronic device by said third party and an identity of said third party.

2. The method of claim 1 wherein when the electronic device is placed on a surface with the face up, a rear camera of the bi-directional cameras captures the image of the electronic device moving away from the surface when picked up by the third party and a front camera of the bi-directional cameras captures the image (s) of the third party in possession of the device.

3. The method of claim 1 wherein when the electronic device is placed on a surface with the face down, a front camera of the bi-directional cameras captures the image of the electronic device moving away from the surface when picked up by the third party and a rear camera of the bi-directional cameras captures the image (s) of the third party in possession of the device.

4. The method of claim 1 wherein tampering of the electronic device by the third party is sensed through an incorrect unlock attempt of entering an incorrect passcode, to trigger the bidirectional cameras to start recording the images of the third party and starting video recording the tampering actions taken by the third party.

5. The method of claim 1 wherein tampering of the electronic device by the third party is sensed when the delay timer for proper unlocking of the device expires which triggers the cameras to silently start capturing images of the third party and video recording of the tampering actions by the third party.

6. The method of claim 1 wherein the microphone within the electronic device is activated to record audio sounds emitted during the tampering of the device and those audio sounds are time and date stamped and uploaded to the cloud source and sent by text and email to the second device.

7. A method for verifying the identity of a third party who picked up and tampered with an electronic device belonging to another, said method comprising:
    (a) an application software that controls functions of bi-directional cameras within said electronic device downloaded and installed within said electronic device to integrate with operating system of said electronic device;
    (b) said application software sensing a movement of said electronic device when picked up by said third party to trigger said bi-directional camera functions on said electronic device to silently start capturing images of said third party in possession of said electronic device;
    (c) said bidirectional cameras in said electronic device silently video recording tampering actions by said third party in possession of said electronic device; and
    (d) said captured images of said third party and said video recordings are time and date stamped and saved within said electronic device and uploaded to a cloud source and sent by text and email to a second device for verifying tampering of said electronic device by said third party.

8. The method of claim 7 wherein when the electronic device is placed on a surface with the face up, a rear camera of the bi-directional cameras captures the image of the electronic device moving away from the surface when picked up by the third party and the front camera of the bi-directional cameras capture the image (s) of the third party in possession of the device.

9. The method of claim 7 wherein when the electronic device is placed on a surface with the face down, a front camera of the bi-directional cameras captures the image of the electronic device moving away from the surface when picked up by the third party and a rear camera of the bi-directional cameras capture the image (s) of the third party in possession of the device.

10. The method of claim 7 wherein tampering of the electronic device by the third party is sensed through incorrect facial recognition and incorrect entry of passcode, to trigger the bidirectional cameras to start recording the images of the third party and video record the tampering actions taken by the third party.

11. The method of claim 7 wherein tampering of the electronic device by the third party is sensed when the delay timer for proper unlocking of the device expires which triggers the cameras to silently start capturing images of the third party and video recording of the tampering actions by the third party.

12. The method of claim 7 wherein the microphone within the electronic device is activated to record audio sounds emitted during the tampering of the device and the audio sounds time and date stamped and uploaded to the cloud source and sent by text and email to the second device.

* * * * *